United States Patent [19]
Jara

[11] Patent Number: 5,826,496
[45] Date of Patent: Oct. 27, 1998

[54] COOKING OVEN

[75] Inventor: Bruce C. Jara, Amherst, Ohio

[73] Assignee: Stein, Inc., Sandusky, Ohio

[21] Appl. No.: 685,340

[22] Filed: Jul. 23, 1996

[51] Int. Cl.⁶ .............................. A47J 37/04; F24C 15/32
[52] U.S. Cl. ........................... 99/443 C; 99/475; 99/477; 126/21 A; 426/523
[58] Field of Search ................. 99/443 C, 474, 99/477, 475, 476; 126/21 A; 426/523, 236, 243, 510–11

[56] References Cited

U.S. PATENT DOCUMENTS

| | | | |
|---|---|---|---|
| 2,593,233 | 4/1952 | White | 126/39 |
| 2,767,667 | 10/1956 | Spooner . | |
| 3,521,459 | 7/1970 | Rath | 99/476 X |
| 3,884,213 | 5/1975 | Smith | 126/21 A |
| 4,121,509 | 10/1978 | Baker et al. | 99/443 C X |
| 4,154,861 | 5/1979 | Smith | 99/443 |
| 4,246,462 | 1/1981 | Meisel | 99/443 C X |
| 4,368,664 | 1/1983 | Smith et al. | 99/386 |
| 4,462,383 | 7/1984 | Henke et al. | 126/21 A |
| 4,473,004 | 9/1984 | Wells et al. | 99/443 C X |
| 4,474,498 | 10/1984 | Smith | 432/144 |
| 4,479,776 | 10/1984 | Smith | 432/144 |
| 4,523,391 | 6/1985 | Smith et al. | 34/225 |
| 4,563,945 | 1/1986 | Hwang | 99/443 C |
| 4,567,819 | 2/1986 | Adamson | 99/349 |
| 4,576,090 | 3/1986 | Burtea | 99/443 C |
| 4,679,542 | 7/1987 | Smith et al. | 126/21 |
| 4,701,340 | 10/1987 | Bratton et al. | 426/511 |
| 4,831,238 | 5/1989 | Smith et al. | 219/400 |
| 4,834,063 | 5/1989 | Hwang et al. | 126/21 A |
| 4,876,426 | 10/1989 | Smith | 99/474 X |
| 4,940,040 | 7/1990 | Randall et al. | 126/21 A |
| 4,960,100 | 10/1990 | Pellicane | 99/474 X |
| 5,078,120 | 1/1992 | Hwang | 126/21 A |
| 5,184,538 | 2/1993 | Ledet | 99/331 |

Primary Examiner—Reginald L. Alexander
Attorney, Agent, or Firm—Oldham & Oldham Co., L.P.A.

[57] ABSTRACT

The invention relates to a cooking oven for cooking food products. A modular cooking oven herein disclosed may include a plurality of modules arranged in end-to-end relationship, with partitions between adjacent modules. A continuously moving conveyor belt extends longitudinally through the oven from an inlet end to an outlet end. Hot cooking gas is continuously circulated in a closed path which is generally perpendicular to the longitudinal axis of the oven. A hot gas is circulated downwardly and then is directed through a plurality of axially spaced transversed slots, both above and below the conveyor, toward the conveyor belt and food cooking thereon. Spent gasses are then deflected away from the conveyor belt into a recirculation path, and are reheated in this return path prior to recirculation in a further cycle. Air and steam inlets are provided at various points, and are so arranged that an operator can provide either similar or different conditions of temperature and humidity in different modules. Within any given module, conditions are highly uniform both along the longitudinal axis of the oven and from side-to-side along the conveyor belt. The oven interior may be cleaned by introducing a full strength cleaning solution through nozzles at various points arranged to contact all surfaces which may accumulate any cooking residue, and washing the cleaning solution down with water, while the oven is warm but not in use.

15 Claims, 7 Drawing Sheets

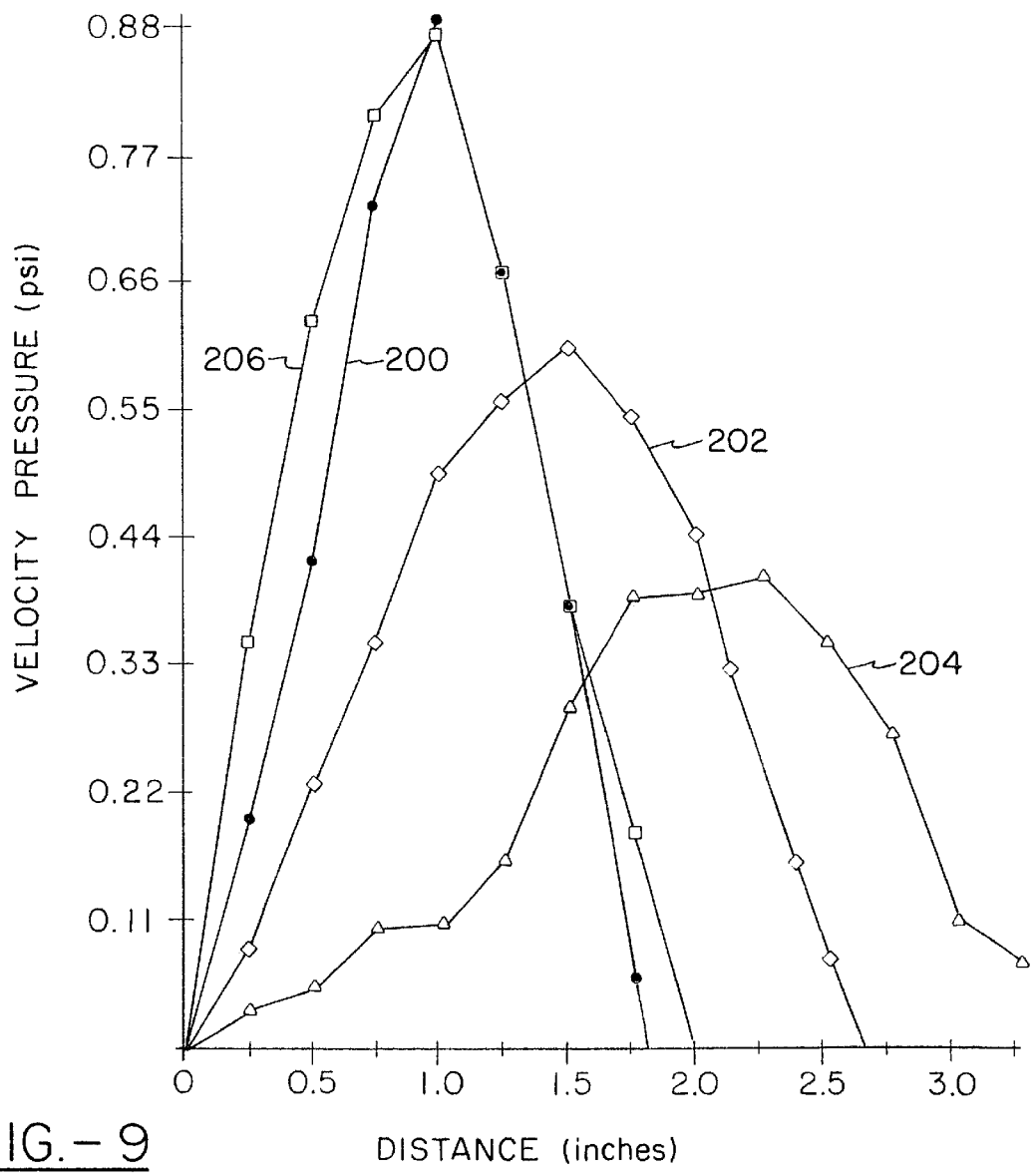
FIG.-9
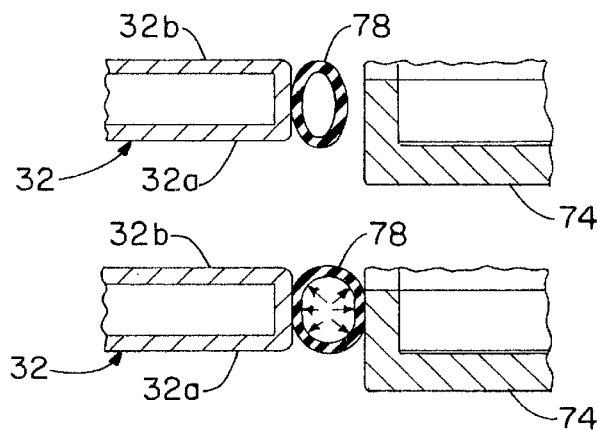
FIG.-10
FIG.-11

COOKING OVEN

BACKGROUND OF THE INVENTION

1. Technical Field

This invention relates to cooking ovens for cooking of food products and in particular to a linear cooking oven for rapid cooking of food products.

2. Description of the Prior Art

Linear ovens for cooking of food have been known for some years. A linear cooking oven typically includes a conveyor belt for conveying food to be cooked from an inlet end to an exit end, and means for supplying a hot gaseous cooking medium and for contacting this cooking medium with the food to be cooked while the food is continuously moving on the conveyor belt. The gaseous fluid may comprise hot air, steam, hot combustion gasses or any mixture of these.

Linear cooking ovens presently known have certain problems. In general, such ovens are designed to provide a high throughout of food products while achieving cooking characteristics for a particular application which produced food products having a predetermined appearance and quality. The process and performance in a continuous mode food processing oven of this type is dependent upon the operating conditions and the characteristics inherent in the design of the oven. In such ovens, it has been difficult to provide a uniform and repeatable cooking environment within the oven so as to allow a repeatable cooking process to be achieved. In a forced convection type of cooking oven, the cooking environment is created by a combination of the air-flow mass velocity, the pattern of airflow, the direction of flow, the process time as well as the temperature and the humidity characteristics of the cooking atmosphere. Because the optimum oven settings for various product types may differ, the oven should have the flexibility to change the processing environment as desired, but in general such flexibility has not been achieved. In general, linear convection ovens have not been able to achieve constant and uniform flow and velocity of the cooking medium throughout the oven. In the forced convection oven, the cooking medium is circulated at high speed through the oven, and is directed against the food products traveling on the conveyor to transfer heat from the cooking medium to the food products. The prior art ovens have not provided sufficient control over the flow of the cooking medium within the oven to provide uniform and consistent control over the cooking process. Further, the forced movement of the cooking medium within the oven has made it very difficult to provide sufficient control over the flow of the cooking medium, particularly at the inlet and exit ends of the oven, where significant amounts of the cooking medium would be forced out through the ends. These end effects can create significant problems in a processing plant environment along with the negative effect on control of the cooking oven. Such ovens have also been susceptible to leaks of the cooking medium from a variety of other locations beyond the inlet and exit ends, due to the effects of thermal expansion or other factors which allow the escape of cooking medium from a variety of locations in the oven chamber. Because such ovens are operated at very high temperatures for certain applications, the change in temperatures during operation of the oven can in fact result in cracks in the oven chamber which will also produce leaks of the cooking medium. The lack of containment of the cooking medium within the oven therefore seriously degrades the ability to effectively control the cooking environment and flow of cooking medium within the oven. Further, these deficiencies of known ovens further affect the ability to produce a cooking environment having the desired temperature and humidity levels. For many cooking applications, it has been found that higher capacities can be obtained using a cooking atmosphere having high humidity. Higher humidity levels have been found to aid in reaching a desired core temperature within the food products during a cooking cycle in a shorter time. Because the cooking medium is forced to flow through the oven, it has been extremely difficult to provide a high humidity cooking atmosphere due to the end effects and leaks from the oven chamber. Depending on the particular food product and application, the desired humidity level to produce optimum results will vary, and there has also been an inability to effectively control humidity levels for optimizing the cooking environment for a particular food product or application.

A further problem noted in prior art ovens is the lack of versatility, or the ability to maintain different cooking conditions in different portions of the oven. In general, known ovens provide a cooking chamber having a defined length and width, with a cooking environment created within the entire cooking chamber which cannot vary to any great extent. It would be desirable to provide the food processor with the ability to adjust the cooking atmosphere in different portions of the oven, to again allow flexibility in operation and the results which can be achieved in a cooking operation. Along with the inability to control the cooking environment at different points within the oven, a significant problem is found in the inability to control the uniformity of cooking conditions including cooking gas temperature, both at different points along the length of the conveyor belt and from one side of the conveyor belt to the other at any given point along the length. Another significant problem with prior art ovens of this type is found in the difficulty encountered in attempting to effectively clean and maintain the oven. Prior art ovens in many cases have included cleaning systems in an attempt to provide the food processor with the ability to effectively clean the oven as required for sanitary operation, but it has been found to be very difficult to provide effective cleaning while minimizing down time of the oven. In the prior art, the construction of the oven has itself made it difficult to clean the oven, as many surfaces within the oven are not exposed to the cleaning system or are otherwise inaccessible, such that effective cleaning is inhibited. Many integrated cleaning systems also rely upon using the oven chamber itself to store cleaning fluids, which increases the time needed for a cleaning operation.

SUMMARY OF THE INVENTION

Based upon the foregoing, it is an object of the invention to provide a cooking oven in which it is possible to control cooking conditions closely and to maintain a high degree of uniformity of cooking conditions, both along the length of the conveyor belt and from side-to-side.

A further object of the invention is to provide a cooking oven which allows the gaseous cooking medium to be effectively contained and controlled to enhance performance characteristics of the oven. The ability to effectively contain the cooking environment allows better and more precise control of the cooking characteristics, and allows the desired humidity levels to be achieved within the cooking chamber. Another object of the invention is to provide a modular oven in which a number of individual oven modules can be used, and can be controlled to allow different cooking conditions to be maintained in different modules.

A still further object is to provide a cooking oven which is easily cleaned.

These and other objects will be apparent from the description which follows.

This invention according to one aspect provides a modular cooking oven for cooking of food products. This cooking oven comprises a longitudinally extending housing having a longitudinal axis, an inlet end and an outlet end, and enclosing a cooking chamber. This housing may be formed by a plurality of modules arranged and coupled in end to end relationship by means of transversely extending partitions. A conveyor belt extends through the housing from the inlet end to the outlet end for conveying of food products thereon. The modules may be independently controlled, and may include separate functional control systems so that the housing has a plurality of air inlets and a plurality of steam inlets so arranged as to permit establishment of either similar or different conditions in different modules. One or more fans or the like are provided for circulating a hot cooking gas in a closed path which is forced toward food products on the conveyor in a direction which is generally perpendicular to the longitudinal axis of the oven. A heater for heating the cooking gas is also provided. The hot cooking gas is directed into a cooking chamber through a plurality of axially spaced transverse slots toward the conveyor belt and the food products positioned thereon. After being directed against food products positioned on the conveyor, the cooking medium is efficiently and effectively removed from the cooking chamber and recirculated within the oven. The flow characteristics if the cooking medium within the oven are controlled to a high degree, to produce uniform distribution of the cooking medium through the slots, producing uniform cooking both across the conveyor belt as well as along its length.

This invention according to a second aspect provides a method for cooking of food products. This method comprises placing the food product to be cooked on a continuously moving conveyor belt in a longitudinally extending cooking oven enclosing a cooking chamber and having a plurality of modules arranged in end to end relationship along a longitudinal axis of the cooking oven. The method further comprises circulating a hot cooking gas in the oven, passing the hot cooking gas through a plurality of axially spaced transfer slots toward the conveyor belt and the food products positioned thereon, so that a plurality of thin transverse gas streams contact the food across the width of the conveyor belt. The cooking gas is then recirculated after having contacted the food products on the conveyor belt, and the recirculating gas stream is reheated before being circulated back to the cooking chamber. In the method, the flow of the cooking gas is controlled such that the thin transverse gas streams are uniform across the width of the conveyor belt, and the cooking gas is also uniformly distributed along the length of the cooking chamber. The plurality of modules allow the cooking environment to be modified along the length of the belt to achieve different cooking characteristics as the food products travel within the oven.

BRIEF DESCRIPTION OF THE DRAWINGS

In the Drawings:

FIG. 7 is a perspective view of an inter-modular connection according to this invention.

FIG. 9 is a graph showing width and peak velocity of a nozzle stream at five inches from the nozzle.

FIGS. 10 and 11 is an enlarged detail drawing of a door seal according to this invention, showing the seal in unsealed and sealed modes, respectively.

DETAILED DESCRIPTION OF THE INVENTION

This invention will now be described in detail with reference to a preferred embodiment thereof, as shown in the accompanying drawings.

Figure 1:
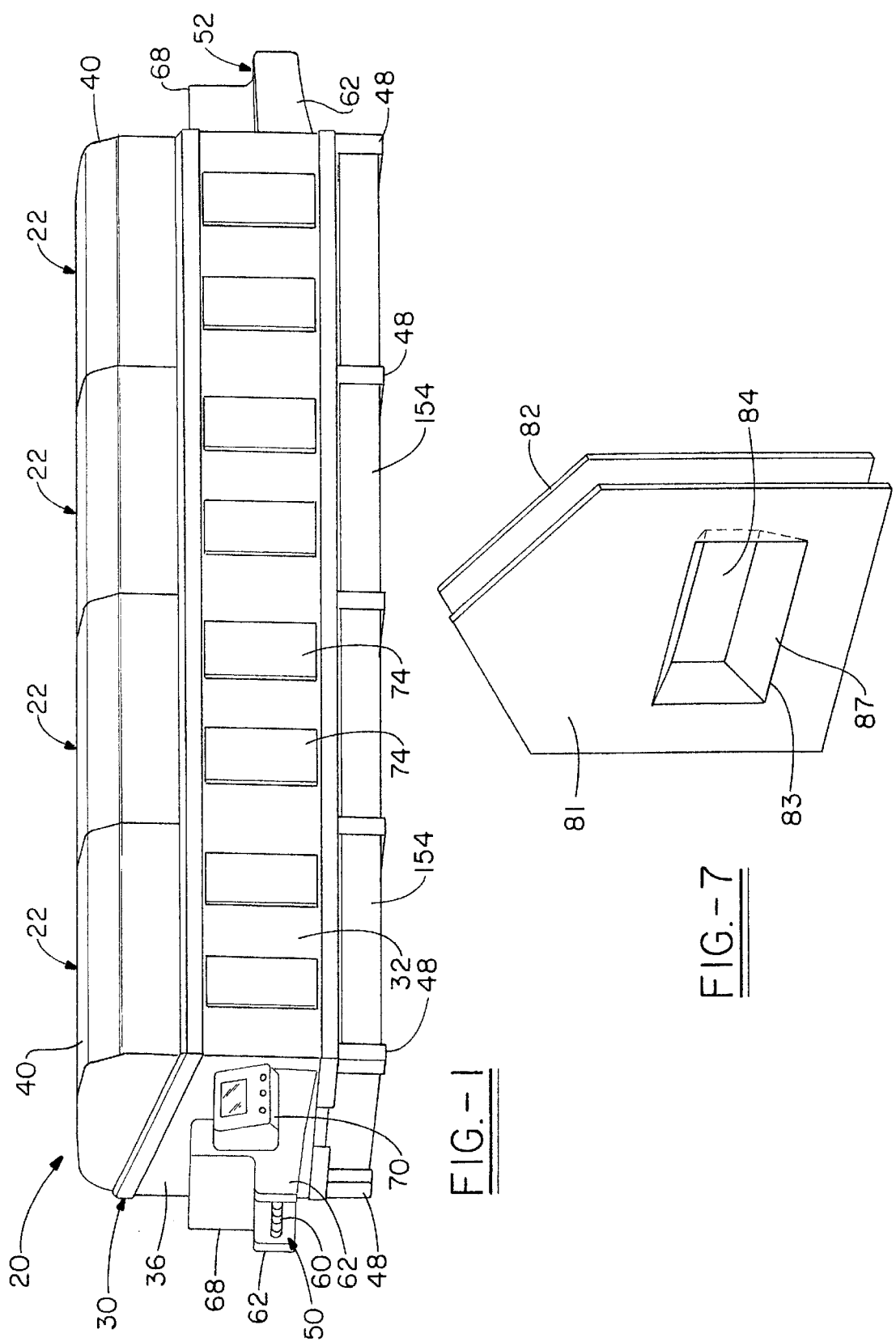
FIG. 1 is a perspective view of the cooking oven of this invention.

Referring now to FIG. 1, 20 is a linear cooking oven according to the invention. Cooking oven 20 is a modular oven which may have any desired number of modules 22 joined together in end-to-end relationship. An oven having four modules 22 is shown for purposes of illustration.

The modules of cooking oven 20 together form a housing or cabinet 30 which has a pair of opposed vertical side walls 32 and 34. The first side wall 32, which may be called the front wall, is lower than the second side wall 34, which may be called a back wall. Side wall 34 is hidden from view in FIG. 1. Housing 30 also has opposite inlet and outlet end walls 36 and 38, respectively. Outlet end wall 38 is hidden from view in FIG. 1. Housing 30 further includes a top wall and a bottom or floor, which will be described in detail later.

Above the top wall of each module 22 are preferably formed cap members 40 corresponding to each of the sections or modules which enclose a space above the top walls of each module to form a passage for coupling the control system of each module and passage of wiring or space for other external equipment as will be hereinafter described. The cap members 40 provide an aesthetically pleasing outer appearance to the oven 20 by hiding all external equipment associated with each module. Also, providing an enclosed space above the oven 20 for storage of external equipment allows the effective width of oven 20 to be reduced, thereby facilitating use in a food processing plant environment. Access into the interior of cap members 41 can be provided by suitable doors provided therein, allowing access to various components positioned within the cap members 41.

Housing 30 may be supported by a plurality of legs 48 associated with each module. End walls 36 and 38 have an inlet opening 50 and an outlet opening 52, respectively. Food products to be cooked are charged to the oven through inlet opening 50 and are discharged through outlet opening 52.

Figure 6:
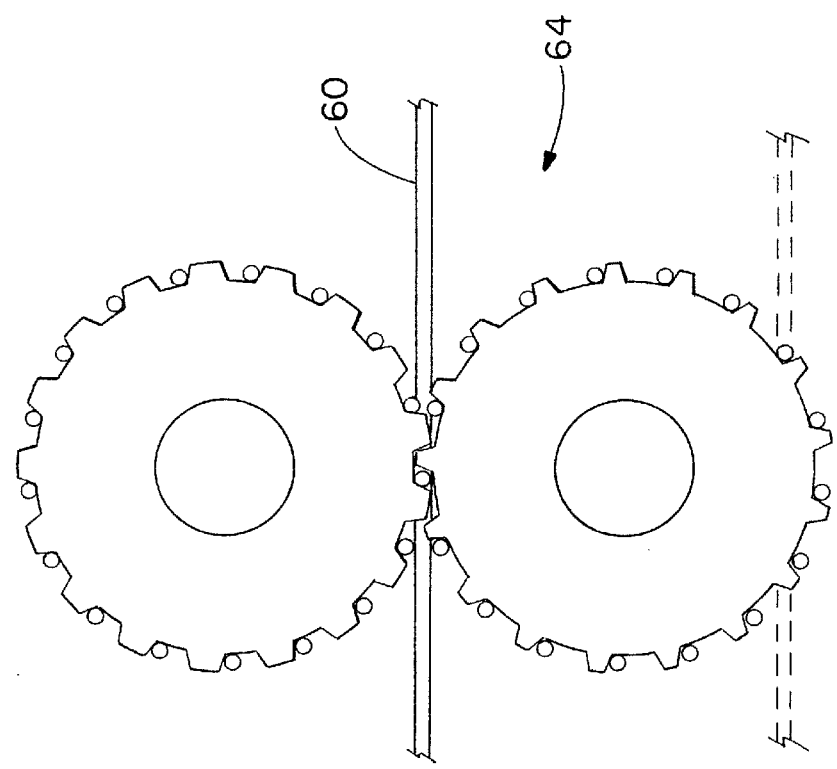
FIG. 6 is an enlarged view of a sprocket for supporting a conveyor belt along its length.

Within housing 30, an endless conveyor belt 60 extends horizontally from the inlet opening 50 to the outlet opening 52, and is adapted to convey food products through oven 20 for cooking. Because a number of modules may be connected together for a particular application, the conveyor belt 60 is adaptable to uniformly convey food products through each module. The belt 60 is preferably a pervious belt which allows flow of a cooking medium therethrough while supporting food products. This also permits liquid, such as fat, which is liberated during cooking, to drip from food on the conveyor belt 60, and facilitates cleaning of the belt. Conveyor belt 60 may extend out of oven 20 to provide loading and unloading sections at 62 to couple oven 20 to other processing equipment in a processing plant. The belt 60 may also be supported at intermediate locations if desired or required. Each support sprocket 64 comprises a pair of intermeshing toothed wheels, one above and the other below conveyor belt 60. One or more motors (not shown) drives the conveyor belt 60 at the sections 62 and/or via intermediate drives such as shown in FIG. 6. Such an intermediate drive may comprise a pair of intermeshing sprockets 64 situated above and below the belt 60, which are driven by a small torque motor. The intermediate drive will facilitate uniform and smooth conveyance of food products through the oven 20, particularly if a larger number of modules 22 are used to create a longer conveyor path.

A pair of discharge stacks 68 (shown in FIG. 1) may be provided for discharge of spent gasses from the cooking oven 20. These extend upwardly from the inlet opening 50 and the outlet opening 52, respectively. The spent gas stream includes air, steam and any gas or vapor products liberated during cooking, and may also include spent combustion gasses (if direct heat exchange combustion products are used as a heat source).

A control system 70 is mounted on the exterior of oven housing 30, preferably at the inlet end thereof. Control system 70 has a touch screen which enables a user or operator to control operation of oven 20. The oven 20 is preferably controlled by means of a programmable logic controller (PLC), which is preferably so programmed such that the user or operator can control each module 22 of the oven 20 individually. In the preferred embodiment, each module 22 will include all function and control systems to allow each to be simply added to the PLC main control panel as a separate screen. Using PLC control also allows the food processor to limit the amount of control given to an operator, to ensure high quality and efficiency without requiring an operator having a high degree of skill. In most food processing environments, there are a variety of different foods and cooking operations which are performed. The control system 70 allows the user to program specific cooking operations into oven 20, based upon the type of food, the configuration of the food, the throughput requirements or belt loading characteristics or the like. These cooking operations can then be stored and recalled from a menu, allowing the oven 20 to be automatically set for a particular application and easily reconfigured for the next application. This again gives the food processor much flexibility and control over its cooking operations, while not requiring highly skilled operators. The control system 70 may also be linked to a central or host computer along with other processing equipment to allow monitoring and control from a central facility. The control system of the oven 20 may also use signals generated by one or more temperature, humidity or other environmental sensors to automatically adjust the operating conditions dependent upon the environment in the plant or room in which the oven is operated.

The separate function and control of each module 22 also provides other significant advantages. Because each module 22 can operate independently, the user may configure the oven 20 to provide different cooking or processing environments in each module, by providing different circulating gas streams to each module. Alternatively, certain modules could be provided with means to grill or sear food products. For example, an operator may supply steam only to one module 22 while supplying a mixture of hot air and steam to other modules 22. The last module 22 may provide a relatively dry, hot cooking environment for browning or searing operations or for cool down (e.g., by circulation of cool air) as desired. Equilibration chambers (not shown and not part of this invention) can be used, if desired, before inlet 50 to preheat a food product and/or after the outlet 52 to cool down a cooked food product discharged from the oven to a temperature which permits handling or the like.

A plurality of spaced access doors 74 are provided along the length of side wall 32 to permit access to the interior of housing 30. The doors 74 provide excellent accessibility to all interior portions of the oven 20 for inspection or servicing. The doors 74 are preferably swing mounted on supporting rods so that they swing quickly and easily from a closed position to a position completely away from the opening in cabinet 30. A tight seal is obtained around the edge of each door by an inflatable elastomeric seal to be hereinafter more fully described, and which is shown in FIGS. 9 and 10. Briefly, a deflated seal 78 is shown in FIG. 9, which when inflated with a fluid under pressure, assumes the configuration shown in FIG. 10 to seal the gap between door 74 and the adjacent wall 32 (or 34). For safety in operation of the oven 20, an interlock system may be provided in conjunction with door 74 to prevent opening of the door 74 or deflation of the seal 78 while the oven is operational. An example of an interlock system may include a magnetic latch or switch coupled to a pneumatic deadbolt associated with each door 74, being controlled by the control system of the oven 20.

Internal Structure and Gas Circulation

The internal structure of the oven 20 and the cooking medium circulation (or more broadly, gas circulation) patterns within the oven 20 are described with particular reference to FIGS. 2–5.

Figure 8:
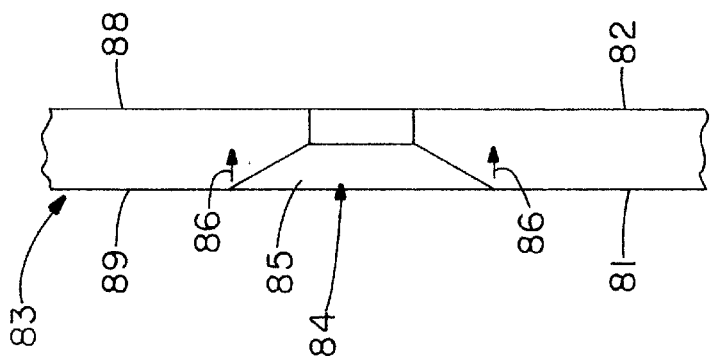
FIG. 8 is a fragmentary schematic side view of the inter-modular connection shown in FIG. 7.

In the preferred embodiment, each module 22 has a pair of spaced transversely extending walls which are spaced apart in the longitudinal direction of the oven 20. The upstream wall of the first module 22 and the downstream wall of the last module 22 form the respective end walls 36 and 38. Similarly, the modules 22 disposed between the inlet and outlet ends of the oven each have an upstream transverse wall 81 and a downstream transverse wall 82 at the respective upstream and downstream ends (in the direction of travel of the conveyor belt 60) of the module. By the same token, the first and last modules 22 have an exterior wall in which the inlet or exit opening is provided, and an interior wall adjacent another module 22. The upstream wall 81 of each module 22 (i.e., each module except the last) and the downstream wall 82 of the next or adjacent module in series (i.e., each module except the first module 22) are spaced apart by a small distance but coupled at the location of a tunnel opening for the conveyor belt 60 formed between each pair of adjacent modules, as best shown in FIGS. 7 and 8. This tunnel opening of each inter-module connection 83 includes an opening 84 in each internal wall 81 and 82. The coupling between modules 22 at this point is configured to be effectively transparent to the food products moving on the conveyor belt 60, such that if similar cooking environments are created in adjacent modules, the division between modules will not create a disparity in the cooking environment created at this location. In the preferred embodiment, the coupling between adjacent modules utilizes a wall configuration as shown in FIG. 8. As will be hereinafter described in more detail, the walls of each module 22 are formed as having an interior skin layer 88 and an exterior skin layer 89, between which may be provided a layer of insulation. The exterior wall 89 is designed at the location of opening 84 to have essentially a built-in Belleville spring formed by flange portions 85 disposed about the entire periphery of opening 84. The flange portions 85 allow compression of the skin 89 towards interior skin 88 as shown by arrows 86, when the module is forced against an adjacent module at this location. For end modules 22, the interior wall is provided with the inter-module connection 83. As adjacent modules are moved together at the location of connection 83, the flange areas 85 are compressed to form a narrow seam at the coupling connection between modules. This connection between modules 22 provides an essentially fluid-tight joint through which the conveyor belt 60 passes, without significant interruption in the cooking environment created in each module 22.

Figure 5:
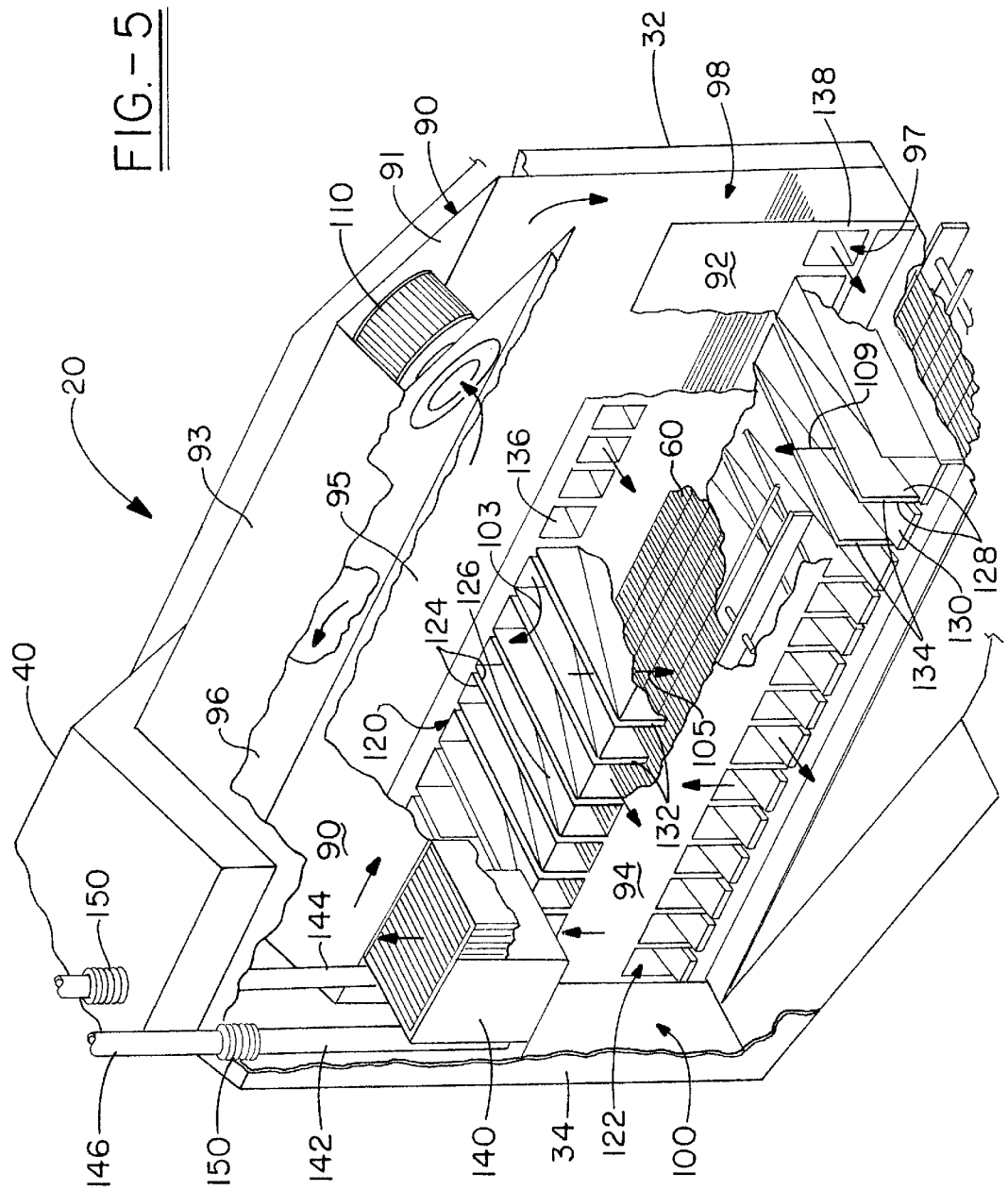
FIG. 5 is a perspective view of a portion of the cooking oven of this invention, with portions cut away to show the interior of the oven and gaseous fluid circulation patterns therein.

As best seen in FIG. 5, the interior of oven 20 has a longitudinally extending ceiling 90 and a pair of spaced vertical walls 92 and 94 which extend downwardly therefrom. Ceiling 90 provides support for a circulating fan 110, within the space between the cap member 40 and ceiling 90. The ceiling 90 in conjunction with walls 92 and 94 form an upper air chamber 96 for circulating air (or air-steam mixture) as will be described. This ceiling 90 is preferably configured as a pitched roof having a peak and a first portion 91 sloping downwardly from the peak toward the side wall 32. A second portion 93 of ceiling 90 extends toward the opposed wall 34. The circulating fan 110 includes a high pressure side and a suction or low pressure side, with a partition wall 96 separating these portions of the fan, to form a high pressure plenum chamber 98 in conjunction with the ceiling 90 and sidewall 32. The angled configuration of ceiling portion 91 facilitates distributing the cooking gas throughout the plenum 98 in a uniform manner, and causes a minimum of disruption in the flow of the gaseous cooking medium, as the cooking gas is made to flow along the interior of ceiling 90, with only a gradual turn at the interface with the interior of wall 32. The plenum chamber 98 also acts as an accumulation chamber, with the cooking gas distributed throughout this chamber before being forced into high pressure plenum regions as will be hereinafter described. Disposed within the interior region of the oven 20, a partition wall 92 extends upwardly from the floor of the oven. The plenum chamber 98 extends longitudinally the length of the oven 20. Internal vertical wall 92 is spaced inwardly from the front (or first side) wall 32 of oven 20, also forming a portion of plenum 98, as well as high pressure plenum regions 95 and 97 which supply the cooking gas to upper and lower portions of belt 60 as will be described. Similarly, a second vertical wall 94, spaced inwardly from the back (or second side) wall 34, provides a return plenum 100 for upflow of spent gasses, i.e., gasses which have contacted the food products conveyor belt 60 and food thereon.

One or more fans 110, located near the longitudinal center of the oven 20, are provided for air (or gas) circulation. These fans 110 are located such that the fan motor is positioned outside of the ceiling 90 and is hidden within the cap 40 as previously mentioned. The fans 110 are configured to circulate the gaseous cooking medium at a predetermined velocity throughout the oven, with the velocity of the cooking gas as it is directed against food products on the conveyor 60 being the more critical and controllable variable. To uniformly distribute the cooking gas within the accumulation chamber 96, a baffle 116 is utilized adjacent the high pressure side of fan 110. In the embodiment as shown in the drawings, the baffle 116, is shown to be elliptical in shape, and is disposed near the longitudinal center of the oven. This baffle is important for obtaining smooth air flow and virtually uniform air flow over both the length and the width of the conveyor belt 60. Depending on the size of the modules 22, or depending upon other variables in the oven configuration, the baffle 116 may be optimized to provide the smooth and uniform air flow within the accumulation chamber 96. It may also be important in many cooking operations, to provide a supply of fresh air into the cooking environment while exhausting gasses which may contain contaminants or the like. An air inlet 99 is provided in a sidewall of the oven, shown to be sidewall 34, and at a point intermediate the ends of the oven 20 or a module 22. Similarly, an exhaust stack 101 may also be positioned at a point intermediate the ends of the oven 20 or module 22, and is preferably positioned to communicate with the plenum 96 to allow cooking gas to be exhausted prior to being recirculated back to the cooking chamber. Providing the air inlet 99 and air exhaust 101 at a position intermediate the ends of the oven also facilitates minimizing any end effects at the inlet and outlet of the oven, with air makeup and return being controlled at a position intermediate these ends. The exhaust stacks 68 previously described, which may be used at the ends of the oven 20 are predominantly provided to capture any expansion gasses created from a heat source which could be used with the oven, or any containment gasses used at the inlet or outlet ends of the oven to further facilitate containment of the cooking gasses therein. Each of the air inlet 99 and air exhaust 101 preferably include dampers (not shown) which provide precise control of air inlet and exhaust, again accomplished without requiring the ingress or egress of cooking air through the inlet or outlet ends of the oven. Providing the air inlet and exhaust at an intermediate point in the oven also reduces interaction between modules, as crossflow between modules is again not required for air makeup or return.

An upper set of air distributors 120, and a lower set of air distributors 122, are provided for directing air toward the conveyor belt 60 and food products being cooked thereon. The air distributors 120 and 122 are disposed on opposed sides of the cooking chamber and belt 60, and are adapted to force the cooking gas at high velocity toward the conveyor belt 60 and the food products distributed thereon. In the preferred embodiment, the distributors 120 and 122 are designed similarly, and provide a parallel plate gas delivery system. More specifically, each distributor 120 comprises a pair of longitudinally spaced vertical rectangular plates 124 and a diagonally extending deflector plate 126. Adjacent plates 124 of adjacent distributors 120, i.e., the downstream vertical plate 124 of one air distributor 120 and the upstream or vertical plate 124 of the next air distributor 120 in this series, are closely spaced, forming a narrow slot 132 between them. Similarly, each lower distributor 122 comprises a plurality of longitudinally spaced vertical rectangular plates 128 and a diagonally extending deflector plate 130 disposed therebetween. As with upper set 120, closely spaced plates 128, in adjacent distributors 122 in the lower set form a narrow slot 134 between the downstream vertical plate 128 of each air distributor 122 and the upstream plate of the next air distributor 122. These slots 132 and 134 provide hot gas (or hot air) streams or curtains which are directed toward the conveyor belt 60. In the preferred embodiment, the longitudinally spaced slots 132 in the upper set of distributors 120, and the slots 134 in the lower set of air distributors 122, are spaced apart or offset by one-half of the length (in the longitudinal direction of the oven 20 as a whole) of an air distributor 120 or 122. This offset relationship facilitates desired control over the flow of the cooking gasses for many applications. In the offset relationship, a negative pressure is created in the region of each slot 132 or 134 to facilitate drawing return gas out of the cooking chamber. Alternatively, the slots 132 and 134 may be positioned in directly opposed relationship so as to create interference between the flow of the cooking gas from opposed slots, which may be desirable for certain applications. The deflector plates 126 and 130 associated with upper distributors 120 and lower distributors 122 respectively, are sloped in opposite directions or toward the return plenum 100. Each deflector plate extends downwardly at an inclined angle between two opposite corners of the pair of longitudinally spaced vertical plates 124 or 128, as the case may be. In the preferred embodiment, the area of the deflector plates 126 and 130 is chosen to accommodate the volume of return air or gas expected from the output of a slot so as to minimize disruption between the gas curtains formed by slots 132 and 134.

A first set of openings 136 in vertical wall 92 (preferably one for each distributor 120) permits hot air or gasses to pass from the supply plenum 98 to a high pressure region disposed immediately above the distributors 120 and indicated as 95. As shown in FIG. 5, gasses from the accumulation chamber 98 are forced through openings 136 along the top of the inclined surface 126. The gasses directed into high pressure plenum 95 essentially circulate upwardly as shown by arrow 103 and then are directed downwardly through slots 132 as shown by arrow 105. So as to be directed at high velocity toward conveyor 60. The parallel plate slot created by adjacent distributors 120 preferably has a length (corresponding to the size of the vertical plates 124), which facilitates creation of a narrow curtain of cooking gas which is uniformly distributed along the width of the slot. The height of the distributors 120 from belt 160 is chosen so that the curtains of cooking gasses created by the parallel plate air delivery system impact the food products positioned on belt 60 prior to significant diffusion of the gasses, and in the preferred embodiment may be positioned approximately five inches from belt 60, with slots 132 having an effective length of six inches. Similarly, a second set of openings 138 in vertical wall 92 permits hot air or gasses to pass from the supply plenum 98 to the distributors 122. In the preferred embodiment, cooking gasses from supply plenum 98 are distributed between the upper distributors 120 and the lower distributors 122 by means of a movable damper system 107 within accumulation chamber 96, used to divide the cooking gas to flow into high pressure chambers 95 and 97. In the lower set of distributors 122, the cooking gas distributed to high pressure plenum 97 is directed through openings 138 and again circulates around and back up through the slots 134 as shown by arrow 109, against the underside of the conveyor 60 and food products positioned thereon. In the preferred embodiment, the cooking chamber about the conveyor 60 is enclosed on both sides to prevent any crossflow of cooking medium in the cooking chamber.

As mentioned, the hot gas or air streams or curtains produced by the parallel plate gas delivery system fan out somewhat as they emerge from the slot 132 or 134 before contacting the conveyor belt 60 and the food products positioned thereon. As shown in FIG. 9, gas velocity (measured as a pressure) as a function of distance along the longitudinal axis, parallel to the length of the oven and across a slot 132 or 134 is shown at 200, for the oven of this invention using a six inch slot length as in the preferred embodiment similar measurements are shown at 202 and 204 for other ovens which are previously known. The results 202 and 204 relate to a known oven as described in U.S. Pat. No. 4,940,040, issued Jul. 10, 1990, which uses a plurality of duct fingers into which the cooking gas is directed, with the duct fingers including slots formed in a plate of the individual duct fingers. The graph shown in FIG. 9 shows that the peak velocities are significantly reduced from those peak velocities achieved by the parallel plate gas delivery system of invention as shown at 200. Similarly, the gas delivered from the slots of a duct finger configuration as shown in this prior patent, and indicated at 202 and 204, also show that gas delivered from the slot spreads out over a significant distance from the slot. In the present invention, the parallel plate delivery system produces a much more narrowly defined curtain of cooking gas which does not spread or defuse as readily as the prior art configuration, as shown by graph 200. Also shown in FIG. 9, is a graph 206, representative of a different parallel plate delivery system configuration, wherein the effective length of the slots formed by the parallel plate configuration is three inches rather than six inches, while still achieving similar peak velocities and beneficial flow pattern. It thus should be evident that the particular configuration of the parallel plate gas delivery system can vary from the preferred embodiment as described herein. In FIG. 9, the data represented in the graphs are taken five inches from a slot. As evidenced by the velocity versus distance curve for an oven of this invention, the significantly higher peak velocities as compared to prior art configurations tested, indicate the higher performance characteristics achievable by the parallel plate delivery system.

Another significant feature of the present invention is found in the parallel plate plenum, and configuration of the upper and lower distributors 120 and 122. As previously described, the distributors 120 and 122 include inclined deflector plates 126 and 130 respectively, which facilitate in conjunction with the high pressure plenums 95 and 97 the focusing of cooking gas into and through formed slots 132 and 134 respectively. Also as previously mentioned, the distributors 120 and 122 in the top and bottom sets are offset with respect to one another, such that a slot 132 in the top set of distributors 120 is positioned immediately above an incline deflector plate 130 associated with one of the distributors 122 in the bottom set. Similarly, the slots 134 formed in the lower set of distributors 122 are positioned immediately below an incline deflector plate 126 associated with one of the top distributors 120. In order to avoid turbulence in the region of the conveyor belt 60 created by intermingling of adjacent curtains of cooking gas produced by adjacent slots 132 and 134, the inclined deflector plates 126 and 130 greatly facilitate removal of cooking gas from the cooking chamber region once it is directed toward and through the conveyor 60. As should be recognized, cooking gas directed from upper slots 132 will be directed against the lower deflector plates 130, which greatly facilitate directing cooking gas from the region of the conveyor belt or the cooking chamber, and directly issue the cooking gas instant thereon into the return chamber 100. Similarly, cooking gas directed from lower slots 134 are directed to upper deflector plates 126, and the gas is similarly issued directly out of the cooking chamber and into the return plenum 100. The inclined deflector plates 126 and 130 substantially prevent turbulence created in the cooking chamber, and also effectively control the flow of the cooking gas within the oven to facilitate containment of the gas in the oven. The ability to affectively control the gasses into and out of the cooking chamber or region in which conveyor 60 runs has been found to contribute end effects at the inlet and outlet ends of the oven 20, and enhances heat transfer of the cooking gas by preventing intermingling of the curtains of cooking gas formed by the parallel plate gas delivery system. The handling of the flow of cooking gas within the oven of the present invention is a significant and highly beneficial aspect of the invention which provides performance characteristics which simply could not be obtained in known ovens. Also, in facilitating containment of gasses within the oven, the cooking atmosphere may now be supplied with moisture, such as a steam source 112 supplied from a steam pipe 114, to obtain a relative humidity within the oven of any desired proportion. The containment of cooking gas within the oven, facilitated by the gas delivery and handling system, more particularly can achieve 100% water vapor by volume or super heated steam, even at high fan speeds and elevated temperatures within the oven. As an example, the oven 20 of the invention has achieved 95% water vapor by volume at a fan speed of 3000' per minute at 475° F. Alternatively, the oven can be used as a steam only oven, wherein 100% humidity at 100° C. is substantially achieved. The ability to precisely control and maintain relative humidities within the oven allows higher yields and therefore higher capacities per square feet while delivering consistent and desired product characteristics in the cooked products. From testing conducted, controlling the relative humidity within the oven very precisely, and containing a high humidity atmosphere as the heat convection gas within the oven can yield extremely beneficial results for a variety of food products and applications.

Spent gasses both above and below the conveyor belt 60 are thus deflected toward the back wall 34 and the return plenum. Return or spent gasses flow upwardly from chamber 100 back to the suction side of fan 110 to be recirculated to complete the flow circuit.

In the return path of the gasses from chamber 100, a heat exchanger 140 is supplied in order to heat the cooking gas back up to cooking temperature and then to recirculate the same. While various heating modes, such as electrical heating, heating by combustion of gasses using indirect heat exchange, and heating by combustion using direct heat exchange (in which the hot combustion gasses form all or part of the circulating gas stream) are contemplated, the Figs. show a thermal fluid heat exchanger as an example. In such a heat exchanger, a hot thermal fluid is supplied to heat exchanger 140 via an inlet conduit 142, and the thermal fluid is returned to the combustion source by a return conduit 144. Conduits 142 and 144 are connected to external conduits 146 and 148, respectively. Since the internal conduits 142, 144 undergo much greater expansion than the external conduits 146, 148, corrugated metal connector sleeves 150 couple the conduits 142 and 144 through roof 90 to allow for unequal expansion. To prevent the formation of cracks or other failures in the oven cabinet, thereby facilitating containment of cooking gas within the oven 20, a variety of unique designs were utilized to allow effective decoupling of the inner skin of the outer walls 32 and 34 and ceiling 90, with respect to the outer skin thereof. The design allows for expansion or contraction based on temperature fluctuations, with the inner skin being configured to move independently from the outer skin. In the preferred embodiment, the inner and outer skins of ceiling 90 are fixed to the housing of fan 110, and from that fixed point are allowed to move independently. At the location of the inlet and outlet thermal fluid pipes 142 and 144, the corrugated connector sleeves 150 are used to decouple the inner and outer skins to allow movement therebetween. As the inlet and outlet pipes 142 and 144 are relatively rigid, the joints 150 are formed as expansion joints, with the corrugated coupler being welded to the inner wall of ceiling 90 at one point, and to the coupler 150 at a separate point. Each of the pipes 142 and 144 are thus coupled to the ceiling through the corrugated connector sleeve to essentially alleve any stress which may otherwise be transferred to the ceiling 90 upon expansion or contraction of the pipes or wall 90. The coupler 150 may also allow rotation of the pipes relative to the ceiling 190. Similarly, the steam inlet pipe 114 may be similarly coupled through ceiling 90 to decouple it therefrom. To also facilitate containment of cooking gas within the oven, the seals around doors 74 are configured to allow for expansion and contraction while preventing any leaks at these locations. In FIGS. 10 and 11, the ceiling of door 74 is shown, wherein a radial seal is made between the door and the housing of the oven 20. In the door 74, inner skin 32a can be constructed of a very lightweight material to allow it to flex based on temperature changes and compared to the outer skin 32b. The ability for the inner skin 32a to flex accommodates for any expected stresses caused by expansion or contraction of the materials based on temperature changes and the radial seal with the door 74 does not transfer any stress to the coupling between the door and the oven housing. As shown in FIGS. 10 and 11, the preferred seal is an inflatable seal which can be pressurized with a suitable fluid to expand into the radial seal configuration as shown in FIG. 11. To further facilitate eliminating leaks at the door seal, the seal 78 itself is designed to be stress relaxed, or such that the seal is designed to account for thermal expansion which would be expected at a mid range of operating temperatures in normal use of the oven. For example, the seal 78 may be configured so that it precisely fits and seals the door opening at approximately 300° F., rather than being thermally relaxed at room temperature. In this manner, the seal 78 does not distort significantly from its stress relaxed configuration at normal operating temperatures, and maintains the seal between the door and the oven cabinet so as to prevent leaks of cooking gasses from the oven. Although air can be used to inflate the seal 78, a cooling fluid such as water could be used for inflation as well as to cool seal 78 to maintain its temperature at a predesigned stress relaxed temperature.

Figure 3:
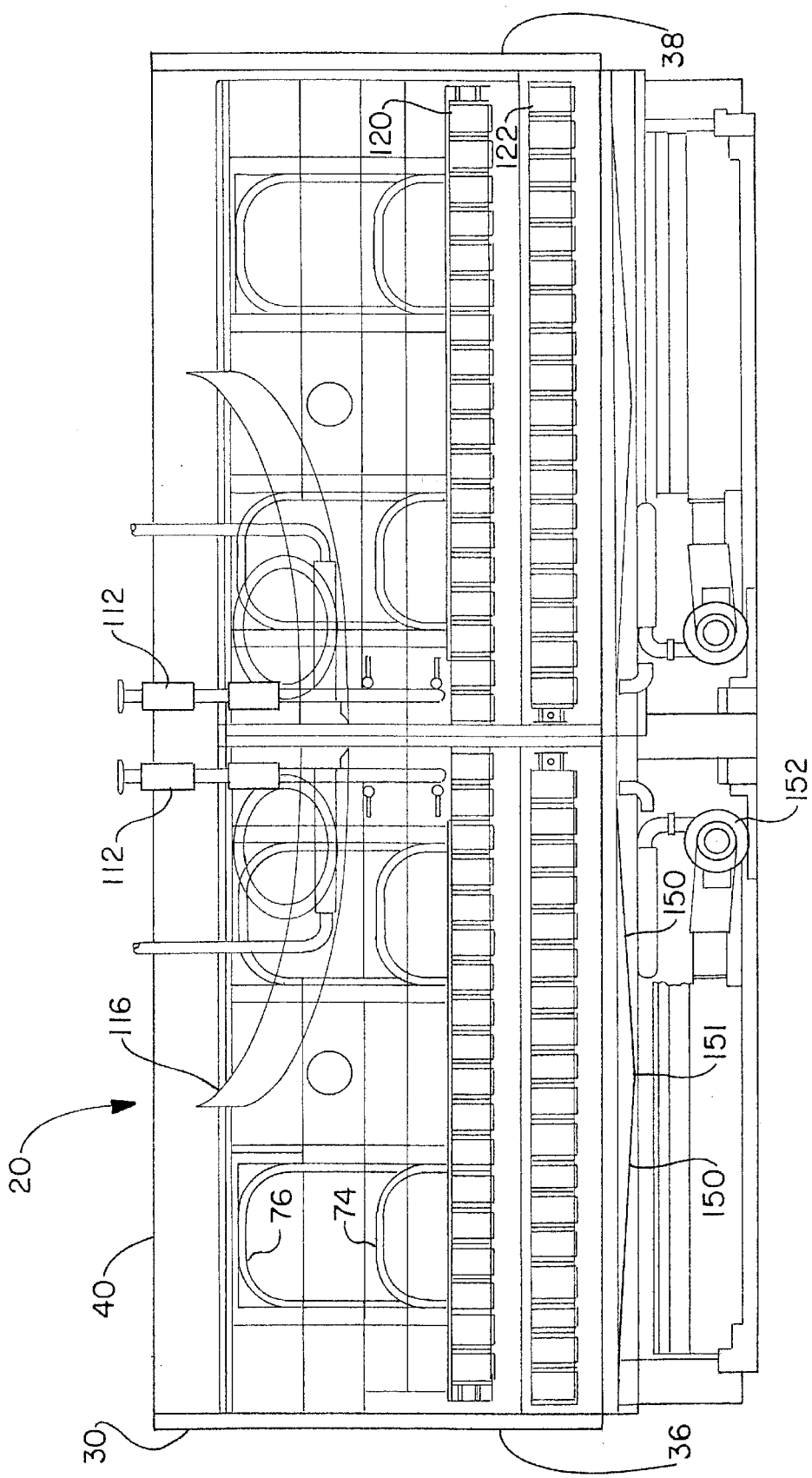
FIG. 3 is a side elevational view of the cooking oven of this invention with portions cut away and portions shown in sections.
Figure 4:
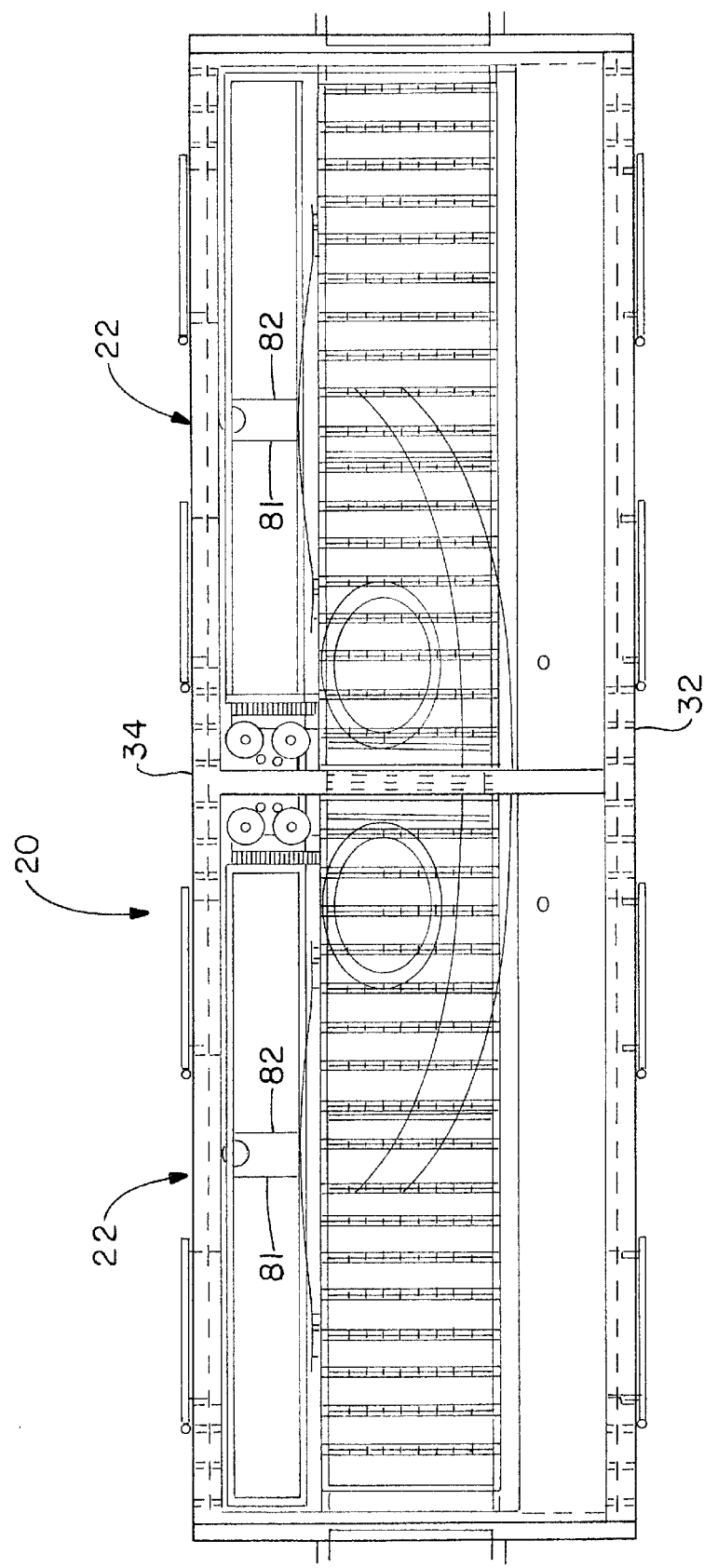
FIG. 4 is a top plan view of the cooking oven of this invention with portions cut away.

Drippings and condensate (from process steam) drop down to the bottom of oven 20, and are caught on a gently sloping run-off plate 150. As shown in FIG. 3, a preferred arrangement is to provide such plates 150 sloping in opposite directions to a central drain 151. In a preferred embodiment, as shown, the length of a sloping plate 150 in the longitudinal direction is about half the length of a module 22, and one drain 151 is supplied for each module. Also in the preferred embodiment the drain 151 is sealed by means of a water trap which allows drainage of water or other liquids, but does not allow the ingress of air. The use of a single drain 151 associated with each module 22 also allows for the collection of fat or other byproducts for recovery or other uses.

Cleaning

Figure 2:
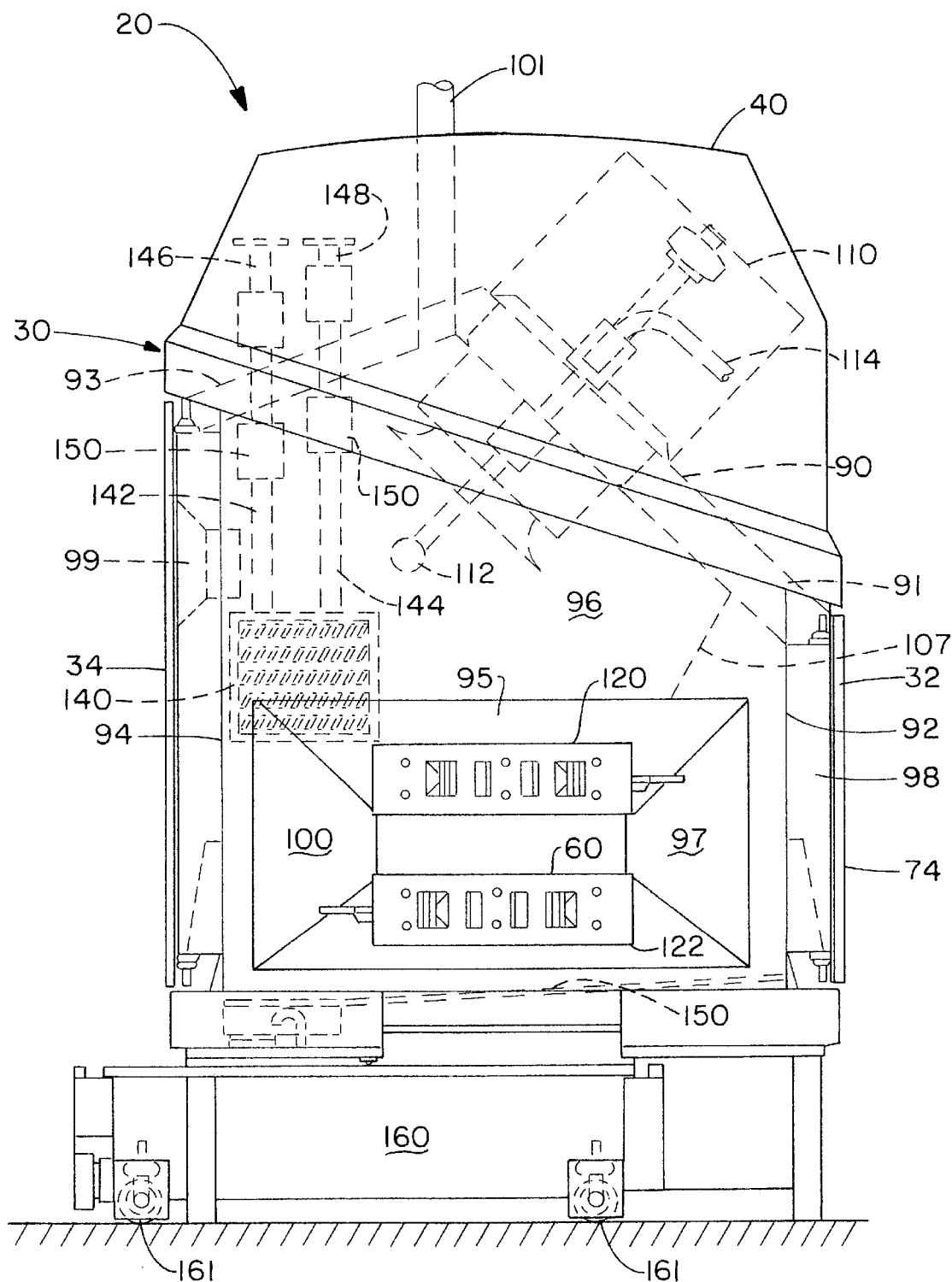
FIG. 2 is an end view of the cooking oven of this invention with portions cut away.

It is another significant advantage in the oven of the invention, that cleaning operations are greatly facilitated by the oven design as well as improvements in the cleaning system associated therewith. In the preferred embodiment, the oven 20 includes a clean in place (CIP) system which has a variety of unique aspects. As seen in FIG. 2, as part of the CIP system, an external tank 160 is provided on wheels 161, which allow the tank 160 to be conveniently positioned beneath the oven 20 when not in use. In the preferred embodiment, the upper surface of tank 160 may provide a catch plate for any fluids issued from the drain 151 associated with one or more modules 22, and also a catch tray for any residue dripping from the conveyor belt which follows a return path directly above tank 160. As will be hereinafter described, the belt 60 is cleaned at some point in the return path, preferably immediately adjacent the inlet end of the oven and just prior to positioning of new product to be cooked thereon. The CIP system is selectively used for periodic cleaning cycles in use of the oven, and it is desirable to minimize the time required for such cleaning cycles, while effectively cleaning all interior surfaces of the oven. For many cooking applications, FDA requirements impose stringent cleaning guidelines which must be met in the design of an oven. Such goals are typically opposed to one another as thorough cleaning normally requires significant time and effort in such ovens. In the present invention, the CIP system is improved to meet both of these goals, and can be used similarly to a more conventional CIP system which utilizes a caustic cleaning agent which has been diluted with water as a cleaning solution. The cleaning solution may be stored in the external tank 160 for immediate use upon initiating a cleaning cycle, rather than requiring the cleaning fluid to be supplied into the bottom of the oven itself for purposes of cleaning. To initiate the cleaning cycle, the CIP tank 160 is slid outwardly from a stored position such as shown in FIG. 2, and a supply hose may be coupled therewith to supply cleaning fluid from tank 160 to a plurality of cleaning nozzles within the oven interior. Typical cleaning nozzles may be utilized, while still achieving better cleaning characteristics due to the fact that all of the surfaces within the oven are generally exposed, and disbursement of cleaning fluid to all surfaces is more easily accomplished. To further facilitate a more conventional cleaning operation, the parallel plate gas delivery system, and distributors 120 and 122 as previously described, can be easily removed for more thorough cleaning if required. Additionally, the inclined deflector surfaces associated with the distributors 120 and 122 effectively urge any cooking residue which may drip from food products as they pass through the oven outward toward the drain.

In a further improvement of the CIP system, conventional spray balls or nozzles used in a CIP system are replaced by aspiration nozzles in conjunction with rinse nozzles coupled to the CIP system. In this embodiment and method of cleaning, a high strength caustic cleanser can be used in its undiluted form as the cleaning agent. In this embodiment, the aspiration nozzles would be supplied with the undiluted caustic under pressure, with the aspiration nozzles acting to atomize the caustic as it is injected into the oven 20. The oven circulation system is then used to distribute the disbursed, atomized caustic overall of the interior surface of the oven. Such procedures are possible because of the containment achieved in the oven of the invention, which does not allow escape of any caustic from the oven which would create a dangerous condition. After dispersing the caustic using the fan 110, the caustic could be left on the interior surfaces for a short time before initiating a rinse cycle to rinse all the interior surfaces and caustic applied thereto. Associated with tank 160, a pump 152 is used to supply a cleaning agent under pressure to the cleaning or aspiration nozzles as desired. A significant advantage of an aspiration system as described lies in the fact that the operator would not have to let the oven cool all the way down prior to initiating a cleaning cycle. As an example, the oven may be cooled slightly from its normal operating temperature, and then the aspiration system could be initiated to disburse undiluted caustic onto all interior surfaces of the oven. Maintaining the interior of the oven at an elevated temperature will facilitate the action of the caustic, and perform a better job of cleaning the interior surfaces. Further, this approach significantly reduces time required for a cleaning cycle, as the cleaning cycle can be initiated prior to complete oven cool down. In a cleaning cycle the steps of applying a caustic and rinsing can be repeated if required, until the oven is clean. At the end of a cleaning cycle, operation of the oven can begin immediately without requiring clean up of the CIP system, again reducing down time of the oven. This CIP tank 160 and system may then be cleaned up after operation of the oven has begun again. Also, in the preferred CIP system, upon extracting tank 160 from its stored position under the oven, stops may be provided along tracks in which wheels 161 are positioned to properly position an access opening of tank 160 to coincide with the drain 151 associated with the oven.

The conveyor belt 60 is also preferably cleaned on the return path by means not shown. The belt cleaning arrangement may be done in accordance with conventional practice in the art.

Operation

Conveyor belt 60 operates continuously whenever oven 20 is in operation. Thus, the cooking oven 20 herein may be referred to as a continuous oven. Uncooked food is loaded onto the conveyor belt 60 continuously at the inlet end as the conveyor belt is constantly moving. The food is then transported through the modules 22 in succession, and emerges cooked, at the outlet end. As the food passes through the oven, the individual modules 22 may be operated either the same or different cooking conditions. Since each module has its own inlet steam supply and the hot gas circulation patterns heretofore described may be separate for each module, it is possible to operate the various modules under different conditions. For example, one module may be operated with steam only. Then the cooked food product may pass to another module, which for example may be operated with a mixture of hot air (or gas) and steam at a much higher temperature than the first module. As already mentioned, the first module 22 may be operated as a preheat module and the last module 22 may be operated as a cool-down module, although for greater efficiency it is preferred to both preheat and cool down before and after the oven, respectively.

The oven of this invention may be built in any convenient size and with any desired number of modules. Also, the distance from the bottom of air distributor plates 124 (and 128) to the conveyor belt may be varied, e.g., from about three inches to about eight inches or at other distances. A preferred, illustrated herein, may have a length of approximately 3 meters (approximately 100 feet), may have four modules as shown, and may have a distance from the bottom of a distributor plate 124 to the conveyor belt of 6 inches. Such oven may have a heat exchanger 140 in each module, with each module also including its own CIP and other systems, such that each module is completely self-contained. Each module has its own cleaning in place (CIP) system, including a tank 160 that can be pulled out like a drawer.

Advantages of an oven of this invention are several. First of all, the cooking gas handling system to precisely control flow of the cooking gas within the oven facilitates containment of gasses within oven 20, and allows for very high humidities within the oven to achieve significant benefits in a variety of cooking operations. The gas handling system effectively allows steam or superheated steam to be used as the convection gas in a forced convection system which obtains high heat transfer characteristics and excellent performance. A further advantage is found in the high degree of uniformity of air velocity, both from side to side along the conveyor belt 60 and along the length of the conveyor belt 60, is achieved in the oven of this invention. Furthermore, effective cooking is obtained with lower air velocity than is usually the case with presently known ovens, due to the parallel plate gas delivery system.

Another advantage is the modular arrangement permits independent control of process conditions in each module.

A still further advantage of this invention is its ease of cleaning.

While this invention has been described in detail with reference to the best modem preferred embodiment thereof, it shall be understood that such detailed description is by way of illustration and not by way of limitation.

What is claimed is:

1. A food processing apparatus for treatment of food products, said apparatus comprising:
   (a) a housing having an inlet and an outlet, said housing enclosing a chamber;
   (b) a conveyor extending from said inlet end to said outlet end for conveying of food products thereon;
   (c) means for circulating a gas in said housing;
   (d) means for treating said gas as it is circulated; and
   (e) a plurality of gas distributors positioned adjacent said conveyor and with adjacent distributors forming a transverse slot therebetween, said plurality of distributors forming a plurality of said axially spaced slots for directing said gas through said plurality of slots toward said conveyor and food positioned thereon wherein said plurality of gas distributors are positioned in axially spaced relationship with one another, each distributor comprising a pair of longitudinally spaced plates and a diagonally extending deflector plate, wherein adjacent vertical plates of adjacent distributors are spaced close together to form a narrow slot therebetween.

2. An apparatus as claimed in claim 1 wherein two sets of gas distributors are provided, one set being above the conveyor and the other set being below the conveyor, and wherein slots in the first set are axially offset from slots in the second set by a distance equal to approximately one-half of a distributor in the axial direction.

3. An apparatus as in claim 1, wherein said housing forms a module and a plurality of modules are positioned together with said conveyor forming a path traveling through each of said modules.

4. An apparatus as in claim 3, wherein said means for treating said gas in each of said modules permits establishment of similar or different conditions in different modules.

5. A method for cooking a food product which comprises:
   (a) placing said product on a continuously moving conveyor belt in a longitudinally extending cooking oven enclosing a cooking chamber and having a plurality of modules arranged in an end-to-end relationship along a longitudinal axis of said cooking oven;
   (b) circulating a hot cooking gas in said oven;
   (c) passing said hot cooking gas through a plurality of axially spaced transverse slots toward said conveyor belt and said food cooking thereon, so that a plurality of thin transverse gas streams contact said conveyor belt and said food cooking thereon;
   (d) recirculating spent cooking gas which has contacted said conveyor belt and said food; and
   (e) heating the spent recirculating cooking gas;
   said method further comprising establishing different conditions of temperature and humidity in different modules.

6. A method according to claim 5, said method including introducing air at a plurality of spaced points into said cooking chamber and introducing steam at a plurality of spaced points into said cooking chamber, said air and said steam being so introduced as to provide different cooking conditions in different modules.

7. A method according to claim 5 in which said transverse slots are arranged in two sets, a first set being above said conveyor belt and a second set being below said conveyor belt.

8. An apparatus for treating products, said apparatus comprising:
   (a) a longitudinally extending housing having an inlet end and an outlet end;
   (b) partition means forming inside said housing a treatment chamber, a supply plenum for a treatment medium on the first side of said chamber and a return plenum for spent treatment medium on a second side of said chamber;
   (c) a conveyor extending through said chamber from said inlet end to said outlet end for conveying of products thereon;
   (d) a plurality of treatment medium distributors positioned in axially spaced relationship to each other, each said distributor comprising at least one vertical plate wherein a vertical plate of one distributor and an vertical plate of an adjacent distributor are spaced close together to form therebetween a narrow slot for directing said treatment medium toward said conveyor and said product thereon; and
   (e) means for deflecting said treatment medium into said return plenum.

9. An apparatus according to claim 8, further including means for dividing said chamber into a plurality of modules.

10. An apparatus according to claim 8, wherein said plurality of treatment medium distributors each comprise a pair of longitudinally spaced vertical plates and a diagonally extending deflector plate, wherein a downstream vertical plate of one distributor and an upstream vertical plate of the next distributor are spaced close together to form therebetween a narrow slot for passage of said treating gas toward said conveyor belt; and wherein said diagonally extending deflector plate deflects spent treatment medium toward said return plenum.

11. A method for treating a product which comprises:
   (a) placing said product on a continuously moving conveyor in a housing enclosing a housing chamber;
   (b) circulating a gas in said housing;
   (c) passing said gas through a plurality of axially spaced transverse slots toward said conveyor along the length of said conveyor and said product thereon, so that a plurality of thin transverse gas streams contact said conveyor and said product thereon; wherein said gas is passed laterally into a plenum and initially deflected away from said plurality of said slots and thereafter deflected to pass through the said plurality of said transverse slots toward said conveyor and said food thereon, said transverse slots being located between adjacent axially spaced distributors, and in which the resulting spent gas which has contacted said food is deflected transversely of said conveyor belt into a return plenum for spent gas (d) removing spent treating gas from the region of said conveyor and said product in a direction transverse to the direction of the conveyor belt;

(e) recirculating spent gas which has contacted said product; and (f) treating the spent recirculating gas and recirculating said treated gas to pass through said slots.

12. A method according to claim 11 in which said transverse slots are arranged in two sets, a first set being above said conveyor belt and a second set being below said conveyor.

13. A method according to claim 12 in which the slots of said first set are axially offset from the slots of said second set.

14. A method according to claim 11 in which said chamber has a plurality of modules arranged in an end-to-end relationship along a longitudinal axis of said housing.

15. A method for treating a product, comprising, (a) placing said product on a continuously moving conveyor in a housing enclosing a housing chamber;

(b) circulating a gas in said housing;

(c) passing said gas through a plurality of axially spaced transverse slots toward said conveyor along the length of said conveyor and said product thereon, so that a plurality of thin transverse gas streams contact said conveyor and said product cooking thereon;

(d) removing spent treating gas from the region of said conveyor and said product in a direction transverse to the direction of the conveyor belt;

(e) recirculating spent gas which has contacted said product; and (f) treating the spent recirculating gas and recirculating said treated gas to pass through said slots, wherein first and second portions of said gas are passed laterally into plenums and initially deflected away from said plurality of slots and thereafter deflected through a plurality of transverse slots positioned above and below said conveyor toward said conveyor and said product thereon, said transverse slots being located between adjacent axially spaced distributors positioned above and below said conveyor, and in which the resulting spent gas which has contacted said product is deflected transversely of said conveyor into a return plenum for spent cooking gas.

* * * * *